C. B. HARRISON.
Choppers and Cultivators.

No. 155,945.        Patented Oct. 13, 1874.

WITNESSES:
E. Wolff
O. Sedgwick

INVENTOR:
C. B. Harrison
BY Munn & Co
ATTORNEYS.

UNITED STATES PATENT OFFICE.

CARTER B. HARRISON, OF RALEIGH, NORTH CAROLINA.

IMPROVEMENT IN CHOPPERS AND CULTIVATORS.

Specification forming part of Letters Patent No. 155,945, dated October 13, 1874; application filed June 13, 1874.

*To all whom it may concern:*

Be it known that I, CARTER B. HARRISON, of Raleigh, in the county of Wake and State of North Carolina, have invented a new and Improved Chopper and Cultivator; and I do hereby declare that the following is a full, clear, and exact description of the same, reference being had to the accompanying drawing forming a part of this specification, in which—

Figure 1:
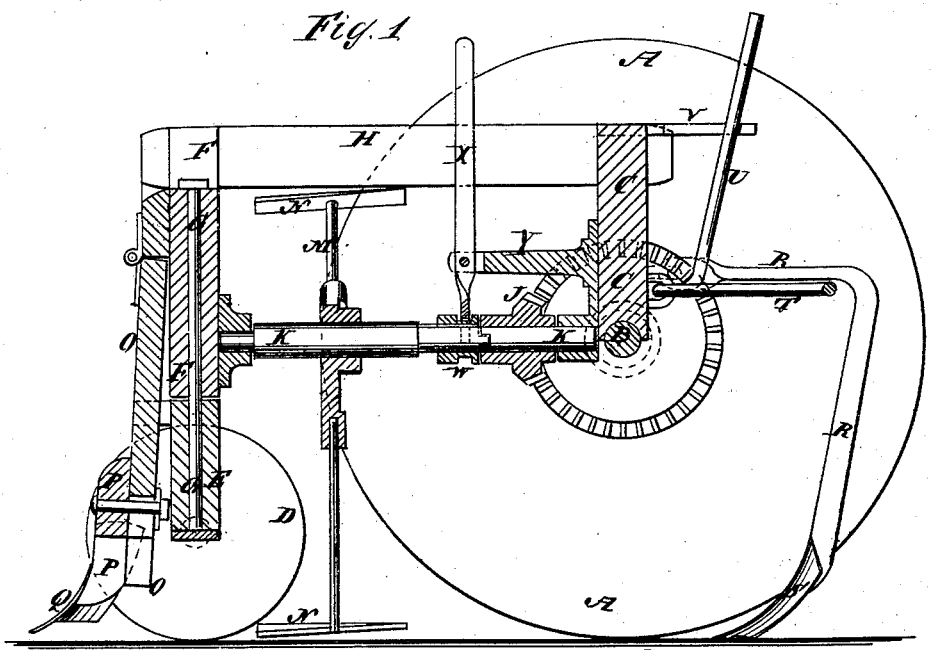
Figure 2:
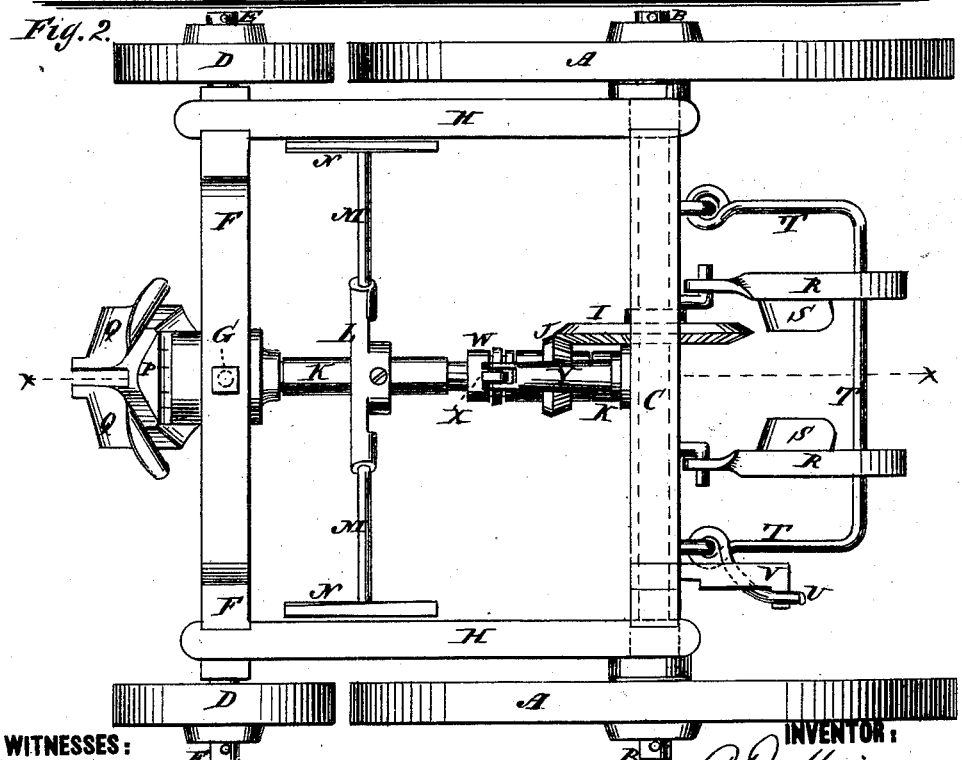

Figure 1 is a longitudinal sectional elevation, and Fig. 2 a plan view.

The invention will first be fully described, and then pointed out in the claim.

A represents the main rear wheels, on whose axle C is a bevel-wheel, I, that gears with a bevel-pinion, J, on the shaft K. The latter is provided with a hub, L, having three equally-distant sockets, in which are adjustably attached the arms M, that carry rotary hoes N N N. Desiring to cut out, by a transverse rotary movement, nine out of every twelve inches in a row of cotton-plants as the wheels move on each side of said row, I make each hoe N nine inches wide, so that the three will cut, at each revolution of shaft K, twenty-seven inches. I make the circumference of wheels A an exact multiple of the hoe-width, or one hundred and eight inches. I then make the bevel-wheel I with three times the number of cogs on the pinion J, so that at each revolution of wheel A eighty-one inches of ground will be cut, leaving nine intervals of three inches each between the cuts. I also make the hoes N slightly bent down toward the front, and up toward the rear, or something in the nature of a spiral, whereby the instrument cuts gradually, and with less expenditure or requirement of power. I also hinge the scraper-shank O, so that it will be automatically lifted in turning by the front axle, the same being thus placed in front of the bolster F.

Having thus described my invention, what I claim as new is—

The scraper-shank O, hinged in front of bolster F, as and for the purpose specified.

CARTER B. HARRISON.

Witnesses:
   C. DEWEY,
   JNO. C. BLAKE.